United States Patent Office 3,231,384
Patented Jan. 25, 1966

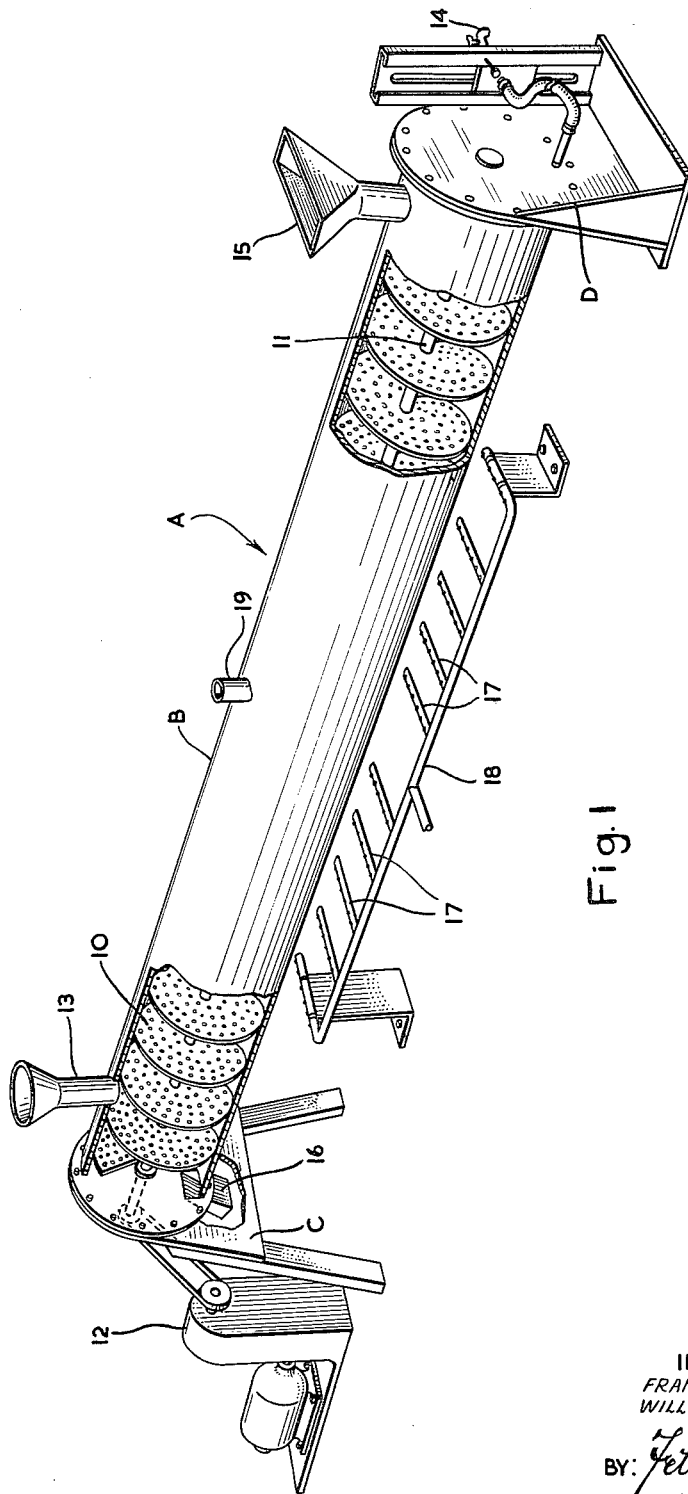

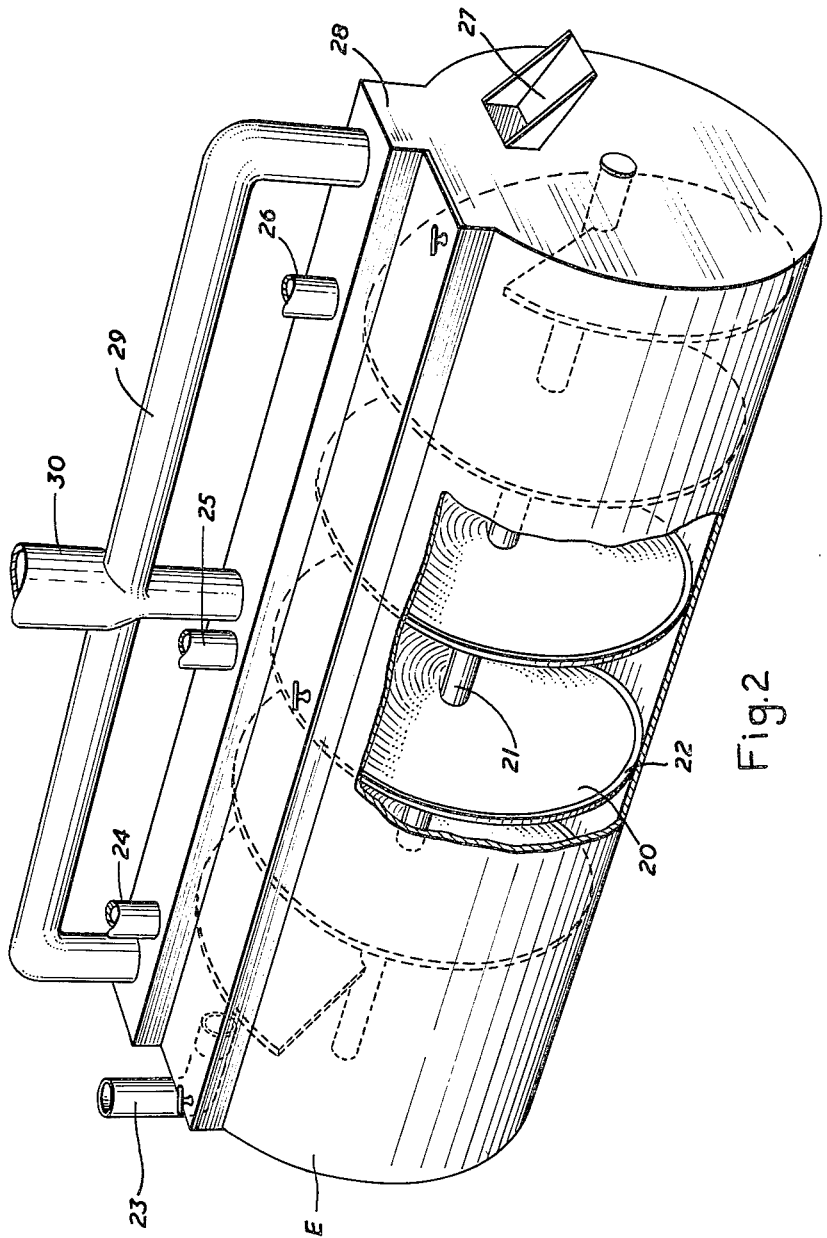

3,231,384
CONTINUOUS BOILING AND HOPPING OF BREWERS' WORT
Francis Lloyd Rigby, Scarborough, Ontario, and William Ernest Parker, Toronto, Ontario, Canada, assignors to Canadian Breweries Limited, Toronto, Canada
Filed Apr. 9, 1962, Ser. No. 186,065
6 Claims. (Cl. 99—52)

This invention relates to continuous boiling and hopping of brewers' wort.

It has been the conventional practice over a long period of years to boil and hop brewers' wort by batch process by introducing wort to a large kettle and boiling it for a period of one to two hours, during which time the required amount of hops are added at intervals throughout the boiling period. At the end of the boiling period, the wort containing the spent hop residue is transferred to another vessel or apparatus wherein the spent hop residue is removed. While this has always produced satisfactory results, the current trend toward continuous brewing processes in which wort is continuously fed and fermented makes it desirable to provide improved methods of hopping and boiling wort as to lend to the efficiency of the complete brewing process. Up to the present time, at least two methods have been suggested for this purpose.

The first involves heating the wort in heat exchangers and passing the heated wort through a vessel containing a bed of hops thereby to extract the hop flavouring substances. The second involves boiling the wort consecutively in a series of small vessels employing a system of pumps and catch basins combined with a moving perforated belt onto which the hops are continuously fed. This is carried out in such a manner that the wort is boiled in kettle No. 1, sprayed over the moving bed of hops, collected in a catch basin under the belt, pumped to kettle No. 2 for further boiling, sprayed again over the moving bed of hops, recollected and reboiled in a third kettle, etc. until the necessary flavouring and concentration of wort is attained.

Both these methods have obvious disadvantages. In the case of the first proposal, the hopping of wort is not truly continuous since after passage of a certain volume of wort through the vessel containing the hops, the hops become exhausted or spent with respect to flavouring substances and the flow of wort has to be diverted to another vessel while the first is emptied and recharged with fresh hops. A further disadvantage arises from heating the wort in a closed system of this character since undesirable volatile components of the hops and wort cannot be vented and removed while, moreover, the superheating of wort above the boiling point at atmospheric temperature, which occurs in such a system, gives rise to cooked flavours. Finally, concentration of wort by volatilizing water, usually a necessary step, is severely limited in such a process, being possible only in the final step when the wort is released at atmospheric pressure. The second proposal has the obvious disadvantage of being cumbersome, requiring numerous pumps and accessory equipment, and is not very efficient with respect to extracting of the hops since the hops are never suspended in the boiling wort.

The present invention obviates the disadvantages of these prior proposals and provides, by an extremely simple method and apparatus, a means of continuously and efficiently hopping and boiling wort in a manner whereby uniform hopping and boiling is achieved in one piece of equipment. Thorough extraction of the hops is achieved while venting undesired volatile constituents, concentration of wort through volatilization of water can be accomplished to a desired degree, and easy control of processing is provided for as to obtain various flavour effects by retention of volatile essential oils which contribute to beer aroma. Furthermore, the throughput volume can be varied over a wide range by adjustment of the wort level without effecting hold-up time or any other factors since if the rate of wort input is reduced, the level in the vessel can also be reduced, maintaining the same ratio of wort input to kettle wort volume and, therefore, constant and uniform wort boiling time. Moreover, the method provides for easy control of heating whereby to cause heat coagulable protein to precipitate from solution, much of which may be removed during the hopping, through its tendency to adhere to the continuously discharging spent hops, in counter-current processing, while in co-current processing some of this material will also tend to adhere to the hops and will be removed on the spent hops when they are separated from the wort subsequently. Removal of such proteinaceous material before boiling takes place, or at least early in the boiling period, has a distinct advantage with respect to the flavour of the final wort.

The method of the present invention generally comprises forming a continuously flowing stream of hot brewers' wort, causing said stream to flow in a substantially horizontal path, continuously introducing a predetermined mass of hops to said stream, heating said flowing wort, venting said stream of undesirable volatiles above said path of flow and controlling the time flow ratio of said wort and hops as to hop said wort to desired degree, and finally continuously discharging spent and hopped wort from said stream. This may be carried out with the wort and hops flowing counter-current to one another, discharging spent hops at one end of the path and hopped wort at the other. Alternatively, it may be carried out in a co-current flow.

The method may be carried out in particularly simple apparatus which may take the form, for counter-current flow, of a substantially horizontally disposed tubular vessel with provision for introducing wort towards one end thereof and hops in the other end thereof and which includes a perforated auger moving the hops in counter-current flow to the continuously flowing wort as to cause spent hops to discharge at one end of the apparatus and hopped wort at the other, and which is a preferred type of apparatus proposed although such counter-current flow might be achieved by apparatus of other design. For co-current flow, the wort is introduced at one end while the hops are introduced adjacent that end and/or selectively along the length of the vessel.

The invention will be clearly understood by reference to the following detailed specification taken in conjunction with the accompanying drawings, in which:

FIG. 1 shows a part-sectional perspective view of one embodiment of apparatus according to the invention; and FIG. 2 shows a perspective view of an alternative apparatus with the casing partially broken away for greater clarity of illustration.

Referring to the drawings, and first of all to FIG. 1, A indicates the preferred form of apparatus as a whole which is generally comprised by a tubular casing B mounted on suitable end standards C and D. Extending through the tubular casing in a screw conveyor 10 rotatable by means of its shaft 11 suitably journalled in the end standards C and D and driven by a power unit 12. The spiral blades of the conveyor are perforated or foraminous in character so that wort which is introduced to the casing by the wort inlet duct 13 disposed adjacent one end of the casing can pass through the openings in the conveyor blades and pass through the casing to the wort outlet 14. A hop inlet duct 15 communicates with the casing B at its opposite end. Consequently, by continuously feeding wort into the casing from the wort inlet duct 13 while continuously feeding hops into the hop inlet duct 15, each in predetermined ratio to the flow, the conveyor 10 rotated in clockwise direction will continuously move the hops counter-current to the flow of the wort. Accordingly, by regulating the equipment to control the time-flow ratio of the wort and hops as to hop said wort to desired degree, hopped wort of desired character is continuously discharged from the wort outlet 14 while spent hops are discharged at the other end of the equipment through the hop discharge outlet 16. The heating of the wort may be conveniently effected by means of the gas jets 17 carried by the gas header 18, the gas jets being suitably spaced from one another and located under a length of the casing B intermediate the ends thereof.

The wort is continuously supplied to the wort inlet 13 and maintained below boiling point at the inlet end by appropriate adjustment of the heat input. In this way, coagulable protein is caused to precipitate from the wort in an area of the inlet end of the casing B and consequently a great deal of this material is eliminated from the wort in this manner and collected by the mass of spent hops moving through that end of the casing to the hop discharge outlet 16. Such precipitate will largely adhere to the continuously discharging mass of spent hops. The wort is brought to boiling by the heating means beyond the wort inlet end thereof and undesirable volatiles arising from the surface of the flowing stream of wort within the casing may be readily vented to atmosphere by means of a suitable vent such as 19.

The casing, as shown, is supported to extend at a slight incline but may be disposed, if desired, to extend horizontally. If the vessel is operated in the horizontal position, spent hops, discharged through the outlet 16, settle in a sump (not shown) from which they discharge through a suitable device such as a rotary valve. If operated in a sloping position, i.e. inclining downwardly towards the wort discharge outlet, the end of the casing where the hops discharge may be left open and the spent hops can, therefore, freely spill out. It will be understood, therefore, that the wort and hops travel in a substantially horizontal path, i.e. truly horizontal or somewhat inclined thereto.

In this way, by means of a very simple apparatus, a continuous stream of boiled and hopped wort is provided, uniformly hopped, and a very thorough extraction of the hops is obtained by use of this counter-current principle, chemical analysis having shown that 95–99% extraction of the bittering substance of the hop is achieved; concentration of the wort through volatilization of water is readily accomplished to the desired degree, and by making provision for introduction of the hops at any intermediate point along the vessel which can readily be effected, an opportunity is provided to obtain various flavour effects, correlated to the length of time the hops are boiled in the wort. Consequently, the amount of retention of volatile essential oils which contribute to beer aroma may thereby be controlled.

As an example of the efficiency of operation, the following table shows the results of two different runs of the process:

*Analytical results from wort from continuous boil kettle*

|  | Run 1 | Run 2 |
|---|---|---|
| Throughput rate, gal./hr | 12.5 | 12.5 |
| Holdup time in kettle, hrs | 1.75 | 1.75 |
| Original Gravity, Plato [1] | 14.4 | 12.2 |
| Final Gravity, Plato [1] | 15.6 | 13.4 |
| Hop Rate, lbs./bbl | 0.4 | 0.33 |
| Isocompounds in wort, p.p.m.[1] | 34.1 | 20.0 |
| α acids in wort, p.p.m.[1] | 4.8 | 2.0 |
| α acids in original hops, percent | 4.7 | 4.7 |
| α acids in spent hops, percent | 0.15 | 0.02 |
| Hop utilization, percent | 97 | 99 |

[1] Comparable values for a regular batch kettle wort are 15–20 p.p.m. isocompounds and 10–15 p.p.m. α acids, showing that the continuous kettle gives better extraction and conversion of the hop bitter substances.

It is obvious that the throughput volume can be varied over a wide range of adjustment of the wort level in the vessel without affecting hold-up time or any other factors. For example, if the rate of wort input is reduced, the wort level in the vessel can also be reduced maintaining the same ratio of wort input to kettle wort volume and, therefore, constant and uniform wort boiling time. Of course, the length of the region of the wort inlet end of the casing, wherein the wort is heated but not boiled, may be varied depending upon the heat applied as to adjust the amount of heat coagulable protein precipitated from solution, removal of which before boiling or at least early in the boiling period having distinct advantage with respect to flavour of the final wort.

It is obvious, of course, that instead of using a flame heater, such as shown, the casing can be heated otherwise as for instance by steam jacket. Moreover, it is obvious also that another form of apparatus might be employed to produce the counter-current processing but the apparatus shown is preferred.

In the alternative apparatus shown in FIG. 2, the tubular casing E employs a screw conveyor 20 designed to be rotated by suitable power means operatively connected in desired manner with its shaft 21. The conveyor 20 in this instance, as shown, in contrast to conveyor 10 of FIG. 1, is not perforated or foraminous. However, these blades may be perforated for control of the hop resident time relative to that of the wort, as will be referred to hereinafter. The blades are preferably provided with a wiping edge 22 of suitable material and preferably a durable plastic material such as Teflon which engages the interior wall of the tubular casing E in wiping relation forming a seal between the flights of the conveyor and which will act as an efficient cleaner for the interior wall of the casing. By contrast in this alternative apparatus, the wort and the hops proceed in co-current flow as compared to counter-current flow in the case of FIG. 1. The wort is continuously introduced to the tubular casing by means of the wort inlet 23 at one end thereof while the hops may be selectively introduced by way of a first hop inlet 24, a second hop inlet 25, and a third hop inlet 26 disposed in spaced apart relation as shown along the length of the tubular casing. The hopped wort containing spent hops is discharged through the wort outlet 27 which is disposed at a selected level below the top of the tubular casing, the outlet being preferably adjustable as to level, but always providing for free space in the upper area of the casing extending into the header 28 and through which undesirable volatiles from the heated mixture may be vented by way of the venting manifold 29 communicating with the stack 30.

The tubular casing is heated by suitable means and the wort is continuously supplied to the inlet 23 and brought to boiling point at the inlet end by appropriate adjustment of the heat input, whereas the ratio of hops to wort is readily controlled through the inlet 24 and/or 25 and 26, bu suitable metering as to achieve the desired hop to wort ratio. Moreover, the character of the hopping can be controlled by use of any or all of the inlets 24, 25 and 26 enabling the brewer to achieve a desired hop flavour or aroma. Obviously, hops introduced through inlet 24 will have a longer boil than hops introduced at 25 and likewise hops introduced here would have a longer boil than through inlet 26.

Further control may be achieved by employing a screw conveyor, the blades of which are perforated. For instance, by employing a perforated conveyor, the flow of the wort will be independent of the rate of passage of the hops through the casing and by control of wort flow and/or conveyor speed, the rate of passage of wort to hops may be relatively faster or slower or equal. Accordingly, processing is reasonably flexible and it will be apparent that by exercising desired control, results similar to those attainable in the counter-current processing may be readily attained in the co-current processing also.

What we claim as our invention is:

1. A method of continuously hopping brewers' wort which comprises continuously flowing a stream of brewers' wort in a substantially horizontal path, adding hops to said wort in said path at a first position thereon, positively carrying the entire mass of said hops throughout their entire period of hopping treatment in said wort from said first position to a second position at a predetermined rate independent of the rate of flow of wort and heating said wort between said first position and said second position along said path to hop it.

2. A method of continuously hopping brewers' wort as claimed in claim 1 in which said hops are carried in a counter direction to said flow of substrate and are removed from said path adjacent said second position.

3. A method of continuously hopping brewers' wort as claimed in claim 2 in which said wort is maintained below the boiling point adjacent said second position on said path whereby coagulable protein in precipitate form is removed from said wort by said hops.

4. A method as claimed in claim 1 in which said hops are added to said wort at at least one other station to said first station, said other station being spaced between said first station and said second station.

5. A method as claimed in claim 2 in which said hops are added to said wort at at least one other station to said first station, said other station being spaced between said first station and said second station.

6. A method as claimed in claim 3 in which said hops are added to said wort at at least one other station to said first station, said other station being spaced between said first station and said second station.

References Cited by the Examiner
UNITED STATES PATENTS

| | | | |
|---|---|---|---|
| 2,127,759 | 8/1938 | Silhavy | 99—52 |
| 2,309,989 | 2/1943 | Saltzman | 99—278 |
| 2,354,093 | 7/1944 | Stein | 99—278 |

A. LOUIS MONACELL, *Primary Examiner.*

ABRAHAM H. WINKELSTEIN, *Examiner.*

M. W. GREENSTEIN, D. M. STEPHENS, *Assistant Examiners.*